(12) United States Patent
Cosentino et al.

(10) Patent No.: US 7,195,804 B2
(45) Date of Patent: *Mar. 27, 2007

(54) PAPERBOARD WITH IMPROVED WET TEAR STRENGTH

(75) Inventors: Steven R. Cosentino, Quinton, VA (US); Christine Creegan, Richmond, VA (US); Stephen K. Franzyshen, Richmond, VA (US); Wesley K. Seiverd, Chesterfield, VA (US)

(73) Assignee: DuPont Teijin Films U.S. Limited Partnership, Wilmington, DE (US)

( * ) Notice: Subject to any disclaimer, the term of this patent is extended or adjusted under 35 U.S.C. 154(b) by 212 days.

This patent is subject to a terminal disclaimer.

(21) Appl. No.: 10/718,334

(22) Filed: Nov. 20, 2003

(65) Prior Publication Data

US 2004/0151929 A1    Aug. 5, 2004

Related U.S. Application Data

(63) Continuation of application No. 10/300,352, filed on Nov. 20, 2002.

(51) Int. Cl.
*A47G 19/22* (2006.01)
*B29D 22/00* (2006.01)
*B29D 23/00* (2006.01)
*B32B 27/12* (2006.01)

(52) U.S. Cl. .................. 428/34.2; 428/34.5; 428/34.6; 428/35.9; 442/395

(58) Field of Classification Search .................. 442/50, 442/394, 395; 428/35.7, 35.9, 36.1, 343, 428/34.1, 34.2, 34.6, 34.5, 478.8, 903.3
See application file for complete search history.

(56) References Cited

U.S. PATENT DOCUMENTS

| | | | |
|---|---|---|---|
| 3,107,139 A | 10/1963 | Cornforth et al. | |
| 3,309,260 A | 3/1967 | Boese | |
| 3,629,047 A | 12/1971 | Davison | |
| 3,758,023 A * | 9/1973 | Meyers | 229/227 |

(Continued)

OTHER PUBLICATIONS http://www.h-b.com/page18.htm, #Fiberweb® Thru-Wall Flashing.

(Continued)

*Primary Examiner*—Terrel Morris
*Assistant Examiner*—Lynda Salvatore
(74) *Attorney, Agent, or Firm*—RatnerPrestia (57) ABSTRACT

A paperboard composite for use in packaging applications includes paperboard adhered to a backing structure, providing enhanced wet tear strength. The backing structure includes an oriented polymer film and a reinforcing scrim, bonded together by a thermal bonding layer. In one embodiment of the invention, the parts of the backing structure are of similar chemical composition, thereby facilitating recycling of scraps and other waste.

18 Claims, 3 Drawing Sheets

U.S. PATENT DOCUMENTS

| | | |
|---|---|---|
| 3,871,947 A | 3/1975 | Brekken |
| 3,908,650 A | 9/1975 | Dunshee et al. |
| 3,948,436 A | 4/1976 | Bambara |
| 4,087,577 A | 5/1978 | Hendrickson |
| 4,106,261 A | 8/1978 | Greenawalt |
| 4,165,210 A | 8/1979 | Corbett |
| 4,269,322 A | 5/1981 | Larson |
| 4,340,558 A | 7/1982 | Hendrickson |
| 4,375,494 A | 3/1983 | Stokes |
| 4,409,274 A | 10/1983 | Chaplin et al. |
| 4,489,120 A | 12/1984 | Hollinger, Jr. |
| 4,507,351 A | 3/1985 | Johnson et al. |
| 4,592,953 A | 6/1986 | Farrar et al. |
| 4,617,223 A | 10/1986 | Hiscock et al. |
| 4,646,917 A | 3/1987 | Schuster |
| 4,854,474 A * | 8/1989 | Murray et al. ............... 220/1.5 |
| 4,871,406 A | 10/1989 | Griffith |
| 5,077,353 A | 12/1991 | Culbertson |
| 5,335,774 A | 8/1994 | Ganz |
| 5,772,819 A | 6/1998 | Olvey |
| 5,826,985 A | 10/1998 | Goodman et al. |
| 5,846,620 A | 12/1998 | Compton |
| 5,985,437 A | 11/1999 | Chappell, Jr. et al. |
| 6,030,477 A | 2/2000 | Olvey |
| 6,071,577 A | 6/2000 | Gardiner |
| 6,168,012 B1 | 1/2001 | Galbierz |
| 6,191,057 B1 | 2/2001 | Patel et al. |
| 6,237,839 B1 | 5/2001 | Brown |
| 6,242,371 B1 | 6/2001 | Quinones |
| 6,280,825 B1 | 8/2001 | Olvey |
| 6,287,658 B1 | 9/2001 | Cosentino et al. |
| 6,357,504 B1 | 3/2002 | Patel et al. |
| 6,420,046 B1 | 7/2002 | Shah et al. |
| 6,509,105 B2 | 1/2003 | Olvey |
| 6,534,137 B1 | 3/2003 | Vadhar |
| 2003/0003249 A1 | 1/2003 | Benim et al. |

OTHER PUBLICATIONS http://supremeinsulation.com/products/fiber/fiber_supp.htm. Fiber Glass Metal Buiding Insulation 202-96.

3m 44 Electrical Tape Data Sheet.

* cited by examiner

PAPERBOARD WITH IMPROVED WET TEAR STRENGTH

CROSS REFERENCE TO RELATED APPLICATIONS

This application is a Continuation in Part of a U.S. patent application filed by Steven R. Cosentino et al. on Nov. 14, 2003, titled TEAR RESISTANT PEELABLE SEAL FOR CONTAINERS, which is a Continuation in Part of pending U.S. patent application Ser. No. 10/300,352, filed Nov. 20, 2002, the contents of both of which are incorporated in their entirety herein by reference.

FIELD OF THE INVENTION

The invention relates to paperboard composites for use in packaging applications. More particularly, it relates to paperboard composites having enhanced wet tear strength.

BACKGROUND OF THE INVENTION

Bottles of beverages such as soft drinks or beer are frequently packaged and transported in containers made of paperboard. One problem associated with such containers is that when they become wet, for instance by atmospheric condensation of moisture due to cold drinks, there may be a deterioration in tear strength, leading to breakage. To overcome this problem, corrugated board is sometimes used instead of paperboard for making such containers, due to its superior strength relative to traditional paperboard. However, corrugated board is heavier and bulkier than paperboard, and graphics printed on it are generally of poorer quality that that obtainable on paperboard.

Thus there remains a need for paperboard-based materials having good tear resistance when wet. In addition, it would be desirable to provide such a paperboard-based material in as inexpensive a manner as possible, using cost-effective processes.

SUMMARY OF THE INVENTION

In one aspect, the invention is a composite paperboard structure comprising a backing structure adhered to a paperboard layer. The backing structure consists of:
 a) an oriented polymer film layer;
 b) a thermal bonding polymer layer adjacent and substantially coextensive thereto, the thermal bonding polymer layer having a thickness between 10% and 40% of a combined thickness of the oriented polymer film layer and the thermal bonding polymer layer; and
 c) a reinforcing scrim polymer layer adjacent and substantially coextensive with the thermal bonding polymer layer.

In another aspect, the invention is a container comprising a plurality of walls defining a cavity for containing an article, wherein at least one of said plurality of walls comprises a composite paperboard structure comprising a backing structure adhered to a paperboard layer. The backing structure consists of:
 a) an oriented polymer film layer;
 b) a thermal bonding polymer layer adjacent and substantially coextensive thereto, the thermal bonding polymer layer having a thickness between 10% and 40% of a combined thickness of the oriented polymer film layer and the thermal bonding polymer layer; and
 c) a reinforcing scrim polymer layer adjacent and substantially coextensive with the thermal bonding polymer layer.

The oriented polymer film layer, the thermal bonding polymer layer, and the reinforcing scrim polymer layer each individually comprise a synthetic condensation polymer. The synthetic condensation polymers each comprise, in polymerized form:
 1) a) a carboxylic acid or a mixture of carboxylic acids, and b) either i) a diamine or a mixture of diamines, or ii) a diol or a mixture of diols, or
 2) an ω-amino acid having more than 2 carbon atoms, or a mixture of such amino acids.

For the backing structure taken as a whole:
 at least 90 mol % of a combined total amount of the carboxylic acid or the mixture of carboxylic acids in the synthetic condensation polymers is the same carboxylic acid,
 at least 90 mol % of a combined total amount of the diamine or the mixture of diamines in the synthetic condensation polymers is the same diamine,
 at least 90 mol % of a combined total amount of the diols or the mixture of diols in the synthetic condensation polymers is the same diol, and
 at least 90 mol % of a combined total amount of the amino acid or the mixture of amino acids in the synthetic condensation polymers is the same amino acid.

DETAILED DESCRIPTION OF THE INVENTION

The invention will next be illustrated with reference to the Figures, wherein the same numbers indicate the same elements in all Figures. Such Figures are intended to be illustrative rather than limiting and are included herewith to facilitate the explanation of the present invention. The Figures are not to scale, and are not intended to serve as engineering drawings.

Figure 1:
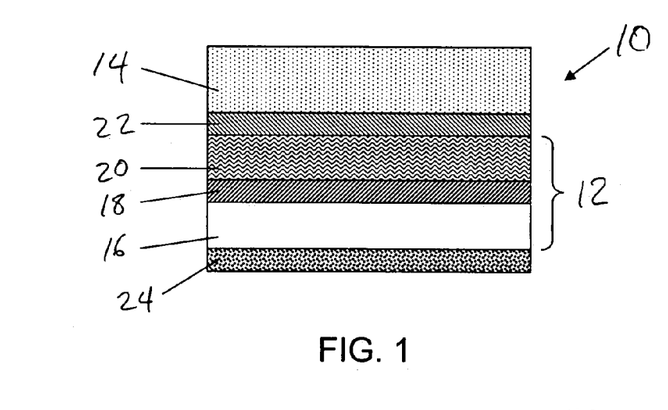
FIG. 1 is a cross sectional view of a composite paperboard structure comprising a backing structure, according to the invention.

Referring now to FIG. 1, there is shown a cross sectional view of a composite paperboard structure, indicated generally at 10, according to an exemplary embodiment of the invention. Composite paperboard structure 10 comprises a backing structure 12 adhered to a paperboard layer 14. In the embodiment shown in FIG. 1, the paperboard is of a single layer, but it may instead be a corrugated paperboard such as is known in the art. An optional adhesive layer 22 provides the adhesion between backing structure 12 and paperboard layer 14, although in some embodiments of the invention these structures are directly bonded to each other without the use of an intervening adhesive layer.

The backing structure 12 is a multilayer assembly consisting of an oriented polymer film layer 16, a thermal bonding polymer layer 18 adjacent and substantially coextensive thereto, and a reinforcing scrim polymer layer 20 adjacent and substantially coextensive with the thermal bonding polymer layer. The thermal bonding polymer layer 18 has a thickness between 10% and 40% of the combined thickness of thermal bonding polymer layer 18 and oriented polymer film layer 16. The combined thickness is at least 5 µm, and typically at least 12 µm. The thickness is at most 60 µm, and typically at most 40 µm. Also shown in FIG. 1 is optional metal layer 24, lying on oriented polymer film layer 16.

Figure 2:
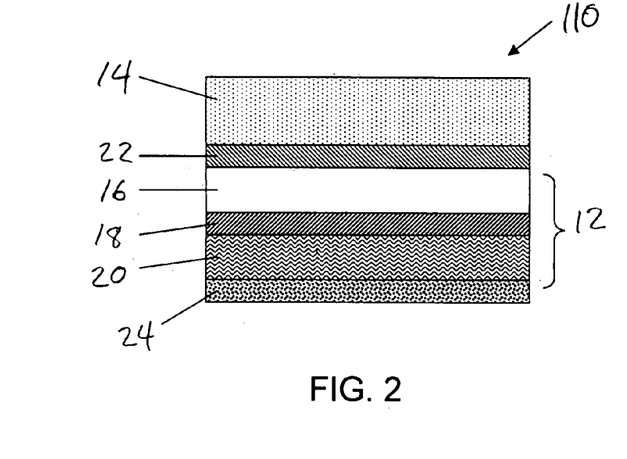
FIG. 2 is a cross sectional view of an alternative composite paperboard structure comprising a backing structure, according to the invention.

FIG. 2 shows an alternative composite paperboard structure, indicated generally at 110, according to the invention. The elements of composite paperboard structure 10 are as described above in relation to FIG. 1, but in this embodiment paperboard layer 14 is adhered to backing structure 12 at oriented polymer film layer 16, via optional adhesive layer 22. Optional metal layer 24 lies on reinforcing scrim polymer layer 20. Such an arrangement may give a brushed metal appearance, which may be desirable for certain applications. Also, this arrangement with scrim layer 20 on the outside, with or without metal layer 24, may offer adhesion advantages when gluing and forming the paperboard carton, due to the roughened surface.

Figure 3:
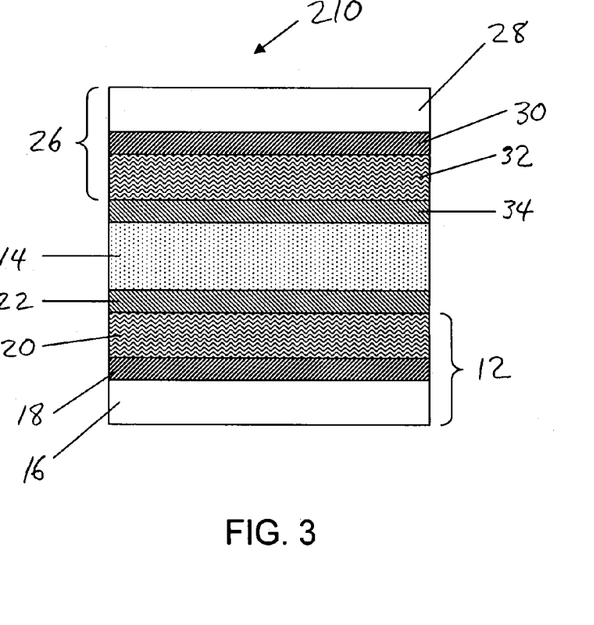
FIG. 3 is a cross sectional view of yet another composite paperboard structure, according to the invention, comprising two backing structures.

FIG. 3 shows another alternative composite paperboard structure, indicated generally at 210, according to the invention. The structure comprises a first backing structure 12 adhered via an optional adhesive layer 22 to paperboard layer 14, as described above. A second backing structure 26 comprising a second oriented polymer film layer 28, a second thermal bonding layer 32, and a second reinforcing scrim polymer layer 32 are adhered via an optional adhesive layer 34 to the paperboard layer 14. Either or both of oriented film layers 16 and 28 may optionally comprise a metal layer (not shown) such as described above in relation to metal layer 24 in FIGS. 1 and 2. In the embodiment shown in FIG. 3, the paperboard layer is adhered to the scrim side of the second backing structure, but it may instead be adhered to the polymer film layer side.

Figure 5:
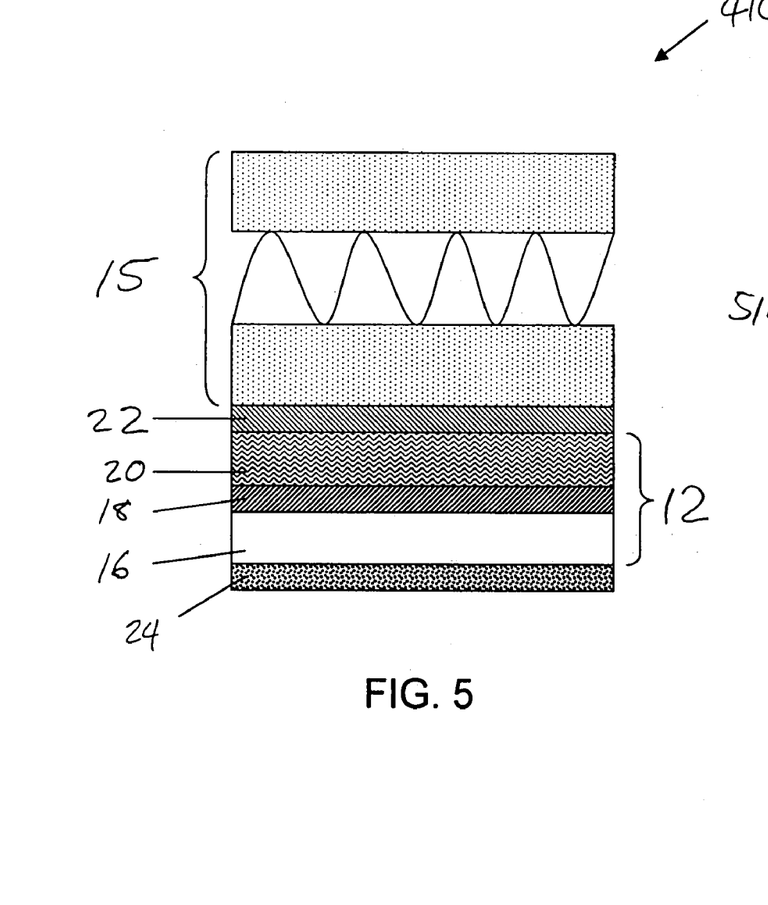
FIG. 5 is a cross sectional view of a composite paperboard structure comprising a backing structure in which the paperboard is corrugated paperboard, according to the invention.

FIG. 5 is a cross sectional view of another composite paperboard structure according to the invention, indicated generally at 410, comprising a backing structure in which the paperboard layer is a corrugated paperboard, shown at 15. The other elements in FIG. 5 are as described above in relation to FIG. 1.

Figure 6:
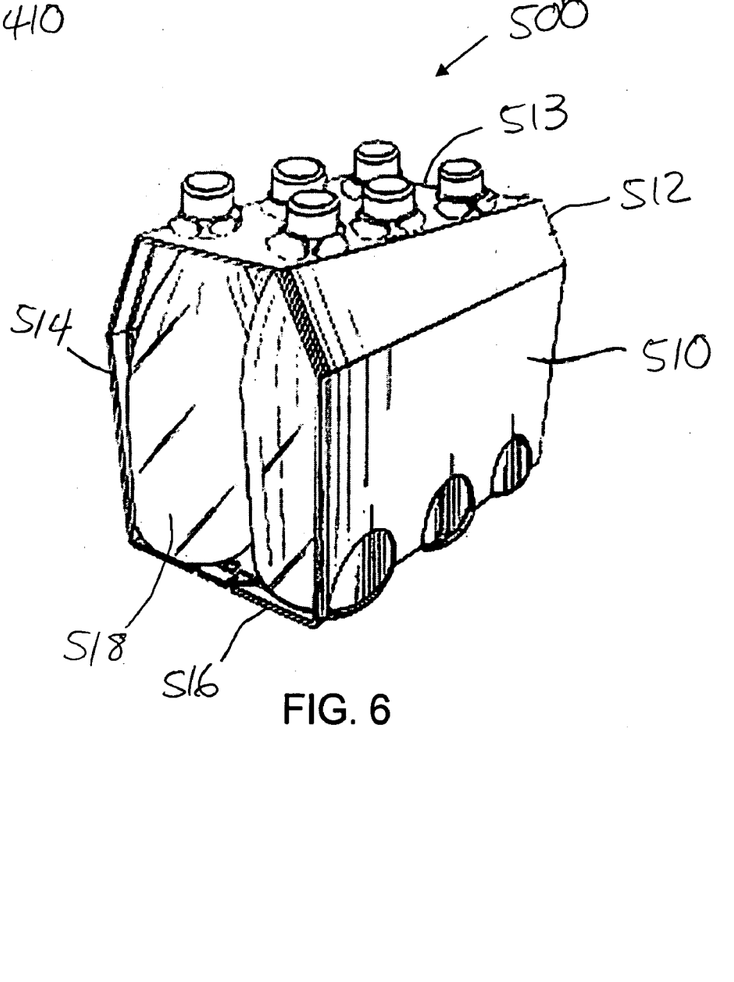
FIG. 6 is a perspective view of a bottle carrier comprising a composite paperboard structure, according to the invention.

FIG. 6 is a perspective view of a bottle carrier according to the invention, indicated generally at 500. The container comprises a plurality of walls 510, 512, 513, 514, and 516 which form a cavity for containing one or more articles, such as the bottles 518. At least one, and preferably all, of the walls are formed from a composite paperboard structure according to this invention. Such a container is typically designed to contain six or twelve or eighteen bottles, but any number of bottles may be contained. In such a container, the backing structure may be oriented toward the inside of the container as a tear- and water-resistant lining or backing, or it may be oriented toward the outside to provide not only tear- and water-resistance, but also provide a good surface for receiving graphics. Optionally, there may be backing structures in both of these locations. For situations in which the backing structure is oriented only toward the inside of the container, and is therefore less visible, the use of a relatively higher percentage of recycle polymer in the oriented polymer film layer, the thermal bonding layer, or the reinforcing polymer scrim layer of the backing structure may be acceptable, since color may be less important in such locations.

In one embodiment of the invention, composite paperboard structures of the invention are characterized in that they comprise a backing structure that is recyclable. The backing structure comprises an oriented polymer film layer, a thermal bonding layer, and a reinforcing scrim polymer layer, all of sufficiently similar chemical composition that the entire backing structure may be recycled without first separating the layers thereof. Specifically, these materials are selected such that it is possible to recover waste material during production runs by the simple recycling of the entire backing structure, without having to separate the layers. The term "recycling" as used in this invention means reuse of the material in the same or a similar process. "Recyclable" means that the recycled material is suitable for use in proportions of 20–70% by weight in the product using the recycled material. If the backing structure comprises an aluminum metal layer, it will typically be removed by washing with caustic before recycling the backing. Such removal of the metal layer is, however, typically not needed if the backing is to be recycled into applications with lower purity requirements, such as fiber.

For example, scraps of polyester-based backing material, including trim waste, unusable rolls, etc. can be shredded and then processed in a pelletizing extruder, such as is well known in the art, to make recycled polyester pellets. Such recycled polyester pellets can be mixed with fresh or virgin polyester polymer, and the mixture re-melted and re-extruded to produce an oriented film, thermal bonding layer, scrim, or other product. The backing structures used for making the composite paperboard structures of the present invention offer a recycling advantage over backing structures made by coating or extruding lamination processes using materials that are not all chemically similar, in which situations the recycled polyester pellets (and products made from them) often tend to degrade and discolor to an unacceptable degree.

In one group of embodiments of the invention providing a recyclable backing structure, the oriented polymer film layer, the thermal bonding polymer layer, and the reinforcing scrim polymer layer each individually comprise a synthetic condensation polymer. Each of these comprises, in polymerized form:

1) a) a carboxylic acid or a mixture of carboxylic acids, and b) either i) a diamine or a mixture of diamines, or ii) a diol or a mixture of diols, or 2) an ω-amino acid having more than 2 carbon atoms, or a mixture of such amino acids.

In this embodiment, the compositions of the layers are such that, for the backing structure taken as a whole, the following requirements are met.

1) At least 90 mol % of a combined total amount of the carboxylic acid or the mixture of carboxylic acids in the synthetic condensation polymers is the same carboxylic acid.

2) At least 90 mol % of a combined total amount of the diamine or the mixture of diamines in the synthetic condensation polymers is the same diamine.

3) At least 90 mol % of a combined total amount of the diols or the mixture of diols in the synthetic condensation polymers is the same diol.

4) At least 90 mol % of a combined total amount of the amino acid or the mixture of amino acids in the synthetic condensation polymers is the same amino acid.

Condensation polymers exemplifying embodiments of the invention according to these requirements may include polyamides comprising, in polymerized form, diacids and diamines, for example nylon 10,12; nylon 6,12; nylon 6,10; and nylon 6,6. These examples each include only a single diacid and a single diamine, but mixtures may be used, as long as mol % requirements 1) through 4) set forth above are met. Suitable condensation polymers may also comprise, in polymerized form, an amino acid such as 6-aminohexanoic acid.

In a preferred embodiment of the invention, the condensation polymers are polyesters, such as have been described above, again provided that the backing structure comprising them meets mol % requirements 1) through 4) set forth above. Particularly preferred are polyesters in which at least the majority of the diacid on a molar basis is terephthalic acid, and at least the majority of the diol on a molar basis is ethylene glycol.

In one embodiment, each of the layers of the backing structure is essentially 100% polyester resin, all of similar intrinsic viscosity, without significant amounts of other components such as surfactants, plasticizers, tackifiers, crosslinking agents, low molecular weight components, non-polyester resins, or other constituents that might adversely affect recycle polymer quality.

Oriented polymer film layer 16, which may be monoaxially oriented or biaxially oriented, may be produced from a linear polyester. Typically the linear polyester will have an intrinsic viscosity from about 0.5 to about 0.8, with about 0.6 being most typical. Preferred polyester films are biaxially oriented polyethylene terephthalate (PET) film and biaxially oriented polyethylene naphthalate (PEN) film.

Especially useful is polyethylene terephthalate that has been biaxially oriented and heatset. Such a material is well known in the art, and is described for example in U.S. Pat. No. 4,375,494 to Stokes.

Polyethylene terephthalate polymer preparation techniques are well known to those skilled in the art and are disclosed in many texts, such as Encyclopedia of Polymer Science and Engineering, 2nd. Ed., Vol. 12, Wiley, N.Y., pp. 1–313. The polymer is typically obtained by condensing the appropriate dicarboxylic acid or its lower alkyl diester with ethylene glycol. Polyethylene terephthalate is formed from terephthalic acid or an ester thereof, and polyethylene naphthalate is formed from 2,7-naphthalene dicarboxylic acid or an ester thereof.

Oriented polymer film layer 16 may also comprise a particulate additive, for example to improve the visual appearance of the product or to modify the permeability of the composite paperboard structure to water vapor or other gasses. One example of a film containing such a particulate additive is a biaxially oriented polyethylene terephthalate containing approximately 15% of titanium dioxide, commercially available from DuPont Teijin Films of Wilmington, Del. under the name Mylar® 365T. Other types and amounts of particulate additives such as for example clay, talc, and silica may also be used according to the invention.

Oriented polymer film layer 16 may also include additives to reduce the flame spread of a composite paperboard structure incorporating it. Incorporation of flame-retardant additives in oriented polymer film layer 16 may reduce the need for such additives to be included elsewhere, for example in paperboard layer 14. Another suitable PET film is Melinex® 389, which contains a UV absorber in oriented polymer film layer 16, which may provide improved stability of the composite paperboard structure for applications with printed graphics.

Thermal bonding polymer layer 18 is capable of forming an adhesive bond to oriented polymer film layer 16 and to reinforcing scrim polymer layer 20, to be described shortly. Typically, thermal bonding polymer layer 18 is formed on a surface of oriented polymer film layer 16 to form a film composite. The composite is subsequently attached to reinforcing scrim polymer layer 20 by applying pressure and by heating to a temperature high enough to soften layer 18 but not high enough to soften or melt the oriented polymer film layer 16 or the reinforcing scrim polymer layer 20.

In a preferred embodiment of the invention, thermal bonding polymer layer 18 may comprise a polyester resin, particularly a copolyester resin derived from one or more dibasic aromatic carboxylic acids, such as terephthalic acid, isophthalic acid and hexahydroterephthalic acid, and one or more glycols, such as ethylene glycol, diethylene glycol, triethylene glycol and neopentyl glycol. A preferred copolyester is derived from terephthalic acid and one or both of isophthalic acid and hexahydroterephthalic acid, and one or more glycols, preferably ethylene glycol. Exemplary copolyesters that provide satisfactory bonding properties in the amorphous state are those of ethylene terephthalate and ethylene isophthalate, especially in the molar ratios 60 to 90 mol % ethylene terephthalate and correspondingly 40 to 10 mol % ethylene isophthalate. Particularly preferred copolyesters comprise 70 to 85 mol % ethylene terephthalate and 30 to 15 mol % ethylene isophthalate, for example a copolyester of approximately 82 mol % ethylene terephthalate and approximately 18 mol % ethylene isophthalate.

In manufacturing composite paperboard structures according to the invention, it may be advantageous to provide oriented polymer film layer 16 and thermal bonding polymer layer 18 together in the form of a film composite. Such a composite may be formed by solvent casting or extrusion of a thermal bonding polymer onto the surface of a self-supporting film of the oriented polymer film layer material, which is preferably a biaxially oriented and heatset film of polyethylene. terephthalate or polyethylene naphthalate.

In the case where oriented polymer film layer 16 is biaxially oriented polyethylene terephthalate and thermal bonding polymer layer 18 is a copolyester resin as described above, the film composite may be conveniently made by a process that includes multiple extrusion through a multiple orifice die or coextrusion of the composite layers, e.g. broadly as described in U.S. Pat. No. 3,871,947, followed by molecular orientation by stretching in one or more directions and heat setting. A convenient process and apparatus for coextrusion, known as single channel coextrusion, is described in U.S. Pat. No. 4,165,210 and GB patent specification No. 1,115,007. The method comprises simultaneously extruding streams of the first and second polyesters from two different extruders, uniting the two streams in a tube leading to a manifold of an extrusion die, and extruding the two polyesters together through the die under conditions of streamline flow so that the two polyesters occupy distinct regions of the flow without intermixing, whereby a film composite is produced.

Biaxial orientation of the polyethylene terephthalate oriented polymer film layer of the film composite may be accomplished by stretching the composite in sequence in two mutually perpendicular directions typically at temperatures in the range of about 78 to 125° C. Generally, the conditions applied for stretching the composite may function to partially crystallize the thermal bonding polymer layer, and in such cases it is preferred to heat set the film composite under dimensional restraint at a temperature greater than the crystalline melting temperature of the thermal bonding polymer layer, but lower than the crystalline melting temperature of the polyethylene terephthalate oriented polymer film layer. The composite is then permitted or caused to cool, rendering the thermal bonding polymer layer essentially amorphous while high crystallinity is maintained in the oriented polymer film layer. Therefore, the stretching operation is preferably followed by heat setting under dimensional restraint, typically at a temperature in the range 150 to 250° C. Convenient processes for stretching and heat setting are described in U.S. Pat. No. 3,107,139. Thus in one embodiment of the invention, the composite paperboard structures according to the invention comprise a film composite formed by coextrusion so that it comprises two layers made of different materials, but forming one sheet of film.

One exemplary coextruded film composite of the sort described above incorporates a biaxially oriented PET polymer film layer 16 and a thermal bonding polymer layer 18 comprising a terephthalate/isophthalate copolyester of ethylene glycol, commercially available from DuPont Teijin Films of Wilmington, Del. under the name Melinex® 301H.

As noted above, the backing structure may optionally comprise a metal layer 24, lying on oriented polymer film layer 16. Metal layer 24 may have a thickness ranging from about 10 to about 5,000 angstroms, most preferably from about 80 to about 300 angstroms, or alternatively have an optical density of from about 1.5 to 3.5 as measured with a Tobias TBX Densitometer, offered by Tobias Associates, Inc. of Glenside, Pa., USA. The layer may comprise any metal. Nonlimiting examples of useful metals include, in addition to aluminum, palladium, zinc, nickel, gold, silver, copper, indium, tin, chromium, titanium, zinc/aluminum alloy, copper/aluminum alloy or copper/zinc/aluminum alloy. Typically, aluminum will be used. A metal layer may serve any of a number of purposes, such as for aesthetic effect, or to serve as a functional water and/or gas barrier layer.

An aluminum metal layer may conveniently be applied by vacuum-depositing aluminum onto an oriented polymer film, using methods and equipment known in the art. For example, a vacuum deposition apparatus available from Galileo Vacuum Systems of Prato, Italy may be used. Other methods such as electroplating and sputtering may be used, and are well known in the art.

In addition to metallation, or instead of it, the polyethylene terephthalate film side of a film composite may optionally be coated via an in-line gravure coater, or by other means, with a primer material that improves its adhesion to water-based and solvent-based coatings and adhesives, thus providing a surface that is more easily printed on, for example. Printing primers are typically based on aqueous polymer dispersions, emulsions or solutions of acrylic, urethane, polyester or other resins well known in the art. One example of such a coating, containing at least one sulfopolyester, at least one tetrablock copolymer resin, and at least one acrylamide/acrylic acid copolymer or salts thereof, is disclosed in U.S. Pat. No. 5,985,437 to Chappell et al. An example of a print-primed film composite is Mylar® 854, sold by DuPont Teijin Films.

Also, in addition to metallization and/or primers on oriented polymer film layer 16, other functional coatings can be applied depending on the requirements of the packaged product. For example, polymeric barrier coatings composed of resins such as polyvinylidene chloride, polyvinyl alcohol for gas barrier, an ethylene-vinyl alcohol copolymer, SiOx, etc. can be coated via aqueous, solvent borne, or sputtering techniques. Other functionality that can be combined with printing and/or the print primer are anti-microbial coatings, security/anti-counterfeiting/brand protection devices such as holograms, chemical dyes and markers, luminescent photochemical coatings, etc. Thus, the oriented polymer film layer of composite paperboard structures according to the invention may optionally be printed, metallized, and overcoated with a print-protective (or other) coatings, so that they become the graphics part of the carrier or carton, while also providing tear resistance.

Suitable nonlimiting examples of materials for making reinforcing scrim polymer layer 20 are woven or nonwoven materials comprising polyester fibers. Many such materials are known in the art, and are referred to generically as "scrim". One suitable nonwoven scrim, a spunbonded copolyester product comprising major and minor proportions of terephthalic acid and isophthalic acid polymerized with one or more diols, is available from BBA Filtration (division of BBA Nonwovens, Nashville, Tenn.) under the name StarWeb® 2253C, and has a basis weight of about 18 g/m$^2$ and a thickness of 0.0038 inches. Another suitable nonwoven scrim, also available from BBA Filtration, is Reemay® 2004 spunbonded polyester, which has a basis weight of about 14 g/m$^2$. Also suitable are Reemay® 2006 and 2250. Nonwoven scrims suitable for use in this invention have a basis weight typically in the range of about 4 to about 100 g/m$^2$, preferably from about 10 to about 30 g/m$^2$, and more preferably from about 10 to about 20 g/m$^2$.

Woven scrims (bi or tri-dimensional) may also be used, especially when a high level of tensile and/or tear strength is desired, and these may vary in basis weight from about 15 to about 300 g/m$^2$. They may be made from any of a variety of polyesters, including but not limited to polyethylene terephthalate and polyethylene naphthalate. Bonding of reinforcing scrim polymer layer 20 to the backing structure 12, on the side having thermal bonding layer 18, may be achieved by applying heat and pressure to cause thermal bonding layer 18 to soften and adhere to scrim polymer layer 20. Suitable equipment for performing such bonding is well known in the art, at includes for example a Model TT Laboratory Coater/Laminator manufactured by Faustel Corp. of Germantown, Wis.

Figure 4:
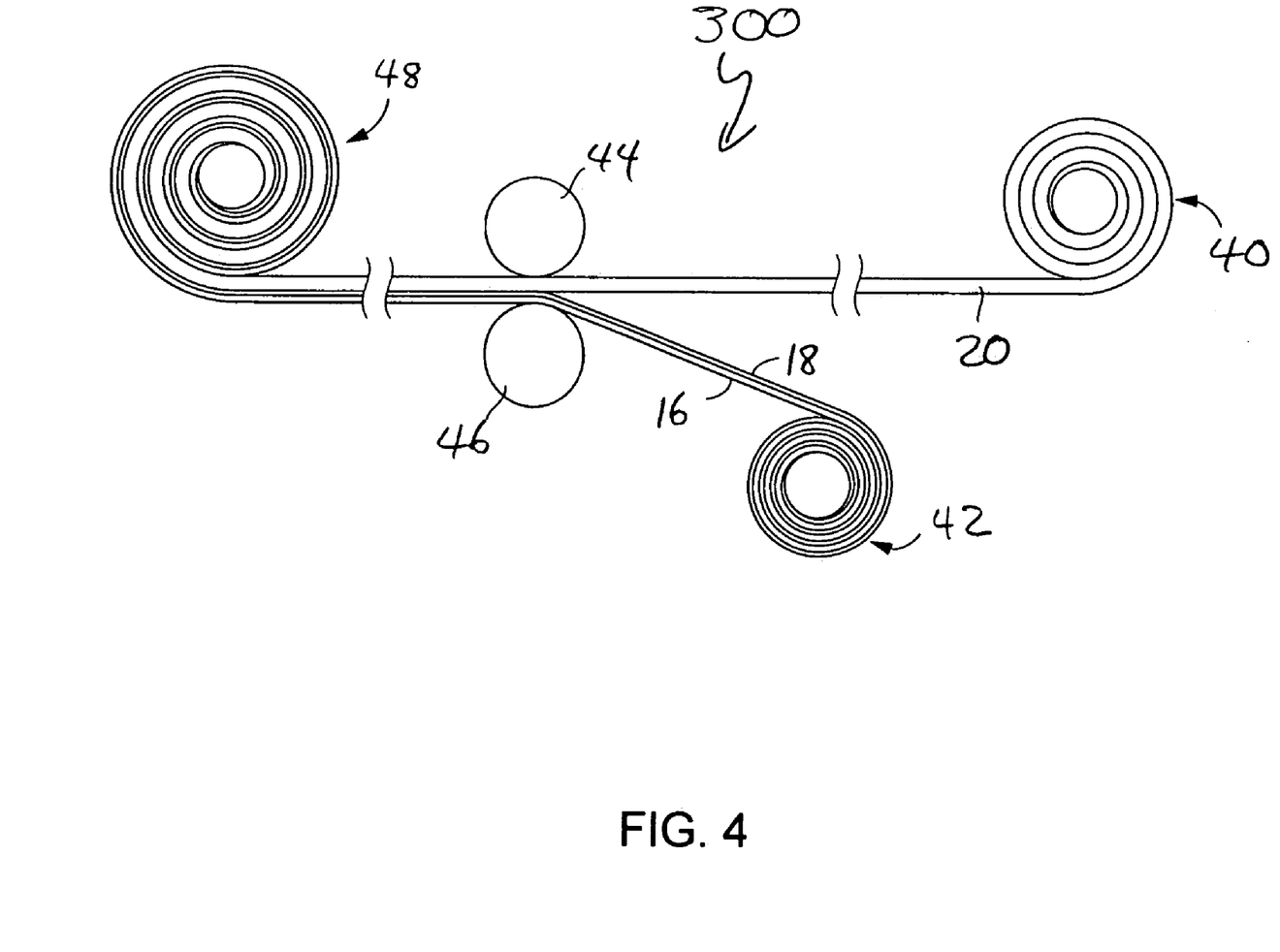
FIG. 4 is a cross sectional view of an apparatus suitable for preparing a backing structure for use in making the composite paperboard structure of FIG. 1.

FIG. 4 shows a cross sectional view of an apparatus for thermally bonding a film composite comprising an oriented polymer film 16 and a thermal bonding polymer layer 18 to a layer of scrim 20. A sheet of material used for scrim layer 20 is fed from a supply roll 40, and the film composite is fed from a supply roll 42, disposed such that thermal bonding layer 18 is facing the scrim 20. The film composite and the scrim are drawn between a pair of heated calender rolls 44 and 46. The heated calender rolls cause the surfaces of the scrim and the film composite to adhere to each other. The calender rolls are heated to a temperature that activates the thermal bonding layer 18 but which does not melt the entire film composite. For example, this temperature is in the range of 200° F. to 500° F. (93° C. to 260° C.) with the preferred temperature range being 260° F. to 330° F. (127° C.–165° C.) for an embodiment of the invention in which the film composite is Melinex® 301H (20 µm thickness), and scrim 20 is a polyester nonwoven material (Starweb™ 2253C). However, higher temperatures in the range of 450° F.–500° F. (232° C.–260° C.) can be used at high line speeds, i.e., speeds of 300 to 400 feet (91 to 122 meters) per minute. The calender rolls are displaced from one another at a distance appropriate to create a nip pressure suitable for lamination.

A backing structure is formed which is pulled through the process equipment by means of a take-up roll 48. An alternative apparatus for thermally bonding a film composite comprising an oriented polymer film 16 and a thermal bonding polymer layer 18 to a layer of scrim 20 is by use of a flatbed lamination machine, such as is available from Reliant Machinery Ltd of Chesham, England.

Adhesive layer 22, if used, may comprise any suitable adhesive capable of bonding backing structure 12 to paperboard layer 14. Many such adhesives are known to the person of normal skill in the art, and include for example ethylene vinyl acetate (EVA), acrylic, and polyvinyl acetate (PVA) adhesives. The adhesive may be applied to the paperboard 14 and/or the backing structure 12, and may be applied as a continuous layer or in a random or regular pattern such as dots, stripes, etc. In one embodiment of the invention, adhesive layer 22 comprises a copolyester, for example one such as is described above in relation to thermal bonding layer 18. In some cases, depending on the nature of the scrim 20, the thermal bonding layer 18, and/or other factors, the use of an adhesive layer 22 may not be required, but adhesion may be achieved merely by heating the backing structure 12 and the paperboard layer 14 together under pressure, for example in a device similar that that shown in FIG. 4, adapted as needed to the particular materials being used.

Paperboard layer 14 may comprise any board known in the art. One example of suitable board is sold under the name Carrier Kote® by MeadWestvaco of Stamford, Conn. The term "paperboard" as used herein includes both single ply paperboard and paperboard in corrugated form, such as is known in the art.

The making of composite paperboard structures using backing structures having good recyclability as described above provides an economic advantage, relative to the use of backing structures not so constructed. By way of comparison, for example, an alternative backing structure might be made by coating or extruding a laminating adhesive between a polyester film and a polyester scrim. Typical adhesives that might be used for such a purpose are water based acrylic, EVA, and the like, such as Henkel 56–7123. Extruded adhesives might include polyethylene or polyethylene copolymers, for example DuPont Elvax® or Bynel®, might be used. However, backing structures made in either of these ways would contain a mixed polymer system that may be difficult to recycle in an industrial or post-consumer environment. This would add significant cost due to loss of utilization of the polyester resin in primary applications, increase in disposal or landfilling costs, or increased sorting, storage, and processing costs to remove any contaminants. Thus recyclable backing structures used according to one embodiment of the invention provide an economic and logistical advantage over these potential alternatives.

Composite paperboard structures such as have been described in the foregoing disclosure have been found to provide a high level of wet tear strength resistance, compared with paperboard either alone or laminated to an oriented polymer film layer without scrim.

EXAMPLES

Samples of paperboard were evaluated for internal tearing resistance according to TAPPI method T414 (Elmendorf-type tear method), adapted to measure wet tear strength by soaking the test samples in deionized water for one hour at room temperature prior to testing. All samples were prepared from MeadWestvaco 18 pt. Carrier Kote® paperboard, with either a single-layer PET film or a backing structure according to the invention adhered to the paperboard. The samples incorporating backing structures were prepared as follows.

An 8.5×11" sample sheet of 18 point Carrier Kote® paperboard was coated with water based adhesive (Henkel 56–7123 or 56–1079) using a #30 wire wound Meyer Rod. The adhesive was applied to the side of the board opposite the clay coated side, resulting in an adhesive thickness of approximately 3 mils. The reinforcing scrim was then immediately laminated to the adhesive-coated side of the board. A standard laboratory glass plate of 5 lb total weight was applied to the backing structure to provide pressure to the laminate while the adhesive set. The weight was kept in place for 24 hours, after which it was removed and the laminate samples tested. Results of wet tear strength evaluations, using a 3200 gram-force pendulum, are shown in Table 1.

TABLE 1

| Sample ID | control* no film | Sample 1 1 mil PET film | Sample 2 3 mil PET film | Sample 3 0.5 mil lam film | Sample 4 0.8 mil lam film |
| --- | --- | --- | --- | --- | --- |
| Tear - MD | | 603.2 | 772.8 | 2624.0 | 1043.2 |
| | | 596.8 | 763.2 | 2918.4 | 2268.8 |
| | | 713.6 | 723.2 | 2755.1 | 1916.8 |
| Average | 487 | 638 | 753 | 2766 | 1743 |
| Std Dev | typically 5–10% | 66 | 26 | 147 | 631 |
| Tear - CD | | 620.8 | 665.6 | 3008.0 | 2185.6 |
| | | 659.2 | 921.6 | 2736.0 | 2880.0 |
| | | 553.6 | 769.6 | 1296.0 | 2745.6 |
| Average | 540 | 611 | 786 | 2347 | 2604 |
| Std Dev | typically 5–10% | 53 | 129 | 920 | 368 |

Published typical values, using a 1600 gram-force pendulum.
MD is Machine Direction, TD is Cross Direction.

Samples 1 and 2 were composed of 1- and 3-mil respectively general purpose polyester films, type Melinex® S, laminated to the board with Henkel 56–1079 water based adhesive. Sample 3 was a 0.5-mil coextruded polyester film, Melinex® 301H, thermally bonded at 300° F. on a flatbed laminator to Starweb® 2253C reinforcing scrim. Sample 4 was a 0.8-mil coextruded Melinex® 301H film thermally bonded at 300° F. on a flatbed laminator to Starweb® 2253C reinforcing scrim. Samples 3 and 4 were laminated to the paperboard with Henkel 56–7123 water based adhesive.

The results shown in Table 1 clearly demonstrate enhanced wet tear strength for the composite paperboard structures of the invention, compared with paperboard alone or paperboard with only film adhered to it.

Composite paperboard structures such as have been described in the foregoing disclosure may be converted, using fabrication techniques known in the art, into containers. Such containers may for example include bottle carriers such as are typically used for carrying eighteen-packs of beer or soft drinks. The presence of backing structures according to the invention in these containers may provide a high level of wet tear resistance to the bottle carriers, improving their performance in wet environments. In some cases, for example where even higher wet tear strength is desired, composite paperboard structures may incorporate corrugated board, as shown for example in FIG. 5, to make containers of exceptional wet tear strength. Beyond the advantages provided by the invention in relation to wet tear strength, improvements in graphics quality may be obtained by printing on the backing structure side of composites provided by the invention, especially in those embodiments in which the oriented polymer film layer (either metallized or un-metallized) is outermost, thereby providing a very smooth surface capable of receiving and retaining high resolution images.

Although the invention is illustrated and described herein with reference to specific embodiments, the invention is not intended to be limited to the details shown. Rather, various modifications may be made in the details within the scope and range of equivalents of the claims without departing from the invention.

What is claimed:

1. A composite paperboard structure comprising a backing structure adhered to a paperboard layer, said backing structure consisting of:
   a) an oriented polymer film layer;
   b) a thermal bonding polymer layer adjacent and substantially coextensive thereto, said thermal bonding polymer layer having a thickness between 10% and 40% of a combined thickness of the oriented polymer film layer and the thermal bonding polymer layer; and
   c) a reinforcing scrim polymer layer adjacent and substantially coextensive with the thermal bonding polymer layer;
   wherein the oriented polymer film layer, the thermal bonding polymer layer, and the reinforcing scrim polymer layer each individually comprise a synthetic condensation polymer,
   the synthetic condensation polymers each comprising, in polymerized form:
   1) a) a carboxylic acid or a mixture of carboxylic acids, and b) either i) a diamine or a mixture of diamines, or ii) a diol or a mixture of diols, or
   2) an ω-amino acid having more than 2 carbon atoms, or a mixture of such amino acids,
   wherein, for the backing structure taken as a whole,
   at least 90 mol % of a combined total amount of the carboxylic acid or the mixture of carboxylic acids in the synthetic condensation polymers is the same carboxylic acid,
   at least 90 mol % of a combined total amount of the diamine or the mixture of diamines in the synthetic condensation polymers is the same diamine, at least 90 mol % of a combined total amount of the diols or the mixture of diols in the synthetic condensation polymers is the same diol, and
   at least 90 mol % of a combined total amount of the amino acid or the mixture of amino acids in the synthetic condensation polymers is the same amino acid.

2. The composite paperboard structure of claim 1, wherein said polymer film layer, said bonding polymer layer and said reinforcing scrim all have a chemical composition that permits recycling said backing structure without separating the layers thereof.

3. The composite paperboard structure of claim 1, wherein the oriented polymer film layer comprises biaxially oriented polyethylene terephthalate.

4. The composite paperboard structure of claim 3, further comprising a second backing structure as defined in claim 1 adhered to the paperboard layer.

5. The composite paperboard structure of claim 3, wherein the thermal bonding polymer layer comprises an amorphous copolyester of about 60 to about 90 mol % ethylene terephthalate and correspondingly about 40 to about 10 mol % ethylene isophthalate.

6. The composite paperboard structure of claim 3, wherein the backing structure is adhered to the paperboard layer via an adhesive layer.

7. The composite paperboard structure of claim 6, wherein the adhesive layer comprises an amorphous copolyester of about 60 to about 90 mol % ethylene terephthalate and correspondingly about 40 to about 10 mol % ethylene isophthalate.

8. The composite paperboard structure of claim 3, wherein the reinforcing scrim polymer layer comprises a woven or nonwoven material comprising polyester fibers.

9. The composite paperboard structure of claim 3, wherein the paperboard layer is adhered to the reinforcing scrim polymer layer.

10. The composite paperboard structure of claim 9, further comprising a metal layer adjacent and substantially coextensive with the oriented polymer film layer.

11. The composite paperboard structure of claim 3, wherein the paperboard layer is adhered to the oriented polymer film layer.

12. The composite paperboard structure of claim 11, further comprising a metal layer adjacent and substantially coextensive with the reinforcing scrim polymer layer.

13. The composite paperboard structure of claim 7, wherein the thermal bonding polymer layer comprises an amorphous copolyester of about 60 to about 90 mol % ethylene terephthalate and correspondingly about 40 to about 10 mol % ethylene isophthalate.

14. The composite paperboard structure of claim 3, wherein paperboard layer is a corrugated paperboard layer.

15. The composite paperboard structure of claim 14, wherein the paperboard layer is adhered to the reinforcing scrim polymer layer.

16. A container comprising a plurality of walls defining a cavity for containing an article, wherein at least one of said plurality of walls comprises a composite paperboard structure comprising a backing structure adhered to a paperboard layer, said backing structure consisting of:
   a) an oriented polymer film layer;
   b) a thermal bonding polymer layer adjacent and substantially coextensive thereto, said thermal bonding polymer layer having a thickness between 10% and 40% of a combined thickness of the oriented polymer film layer and the thermal bonding polymer layer; and
   c) a reinforcing scrim polymer layer adjacent and substantially coextensive with the thermal bonding polymer layer;
   wherein the oriented polymer film layer, the thermal bonding polymer layer, and the reinforcing scrim polymer layer each individually comprise a synthetic condensation polymer,
   the synthetic condensation polymers each comprising, in polymerized form:

1) a) a carboxylic acid or a mixture of carboxylic acids, and b) either i) a diamine or a mixture of diamines, or ii) a diol or a mixture of diols, or
2) an ω-amino acid having more than 2 carbon atoms, or a mixture of such amino acids, wherein, for the backing structure taken as a whole, at least 90 mol % of a combined total amount of the carboxylic acid or the mixture of carboxylic acids in the synthetic condensation polymers is the same carboxylic acid, at least 90 mol % of a combined total amount of the diamine or the mixture of diamines in the synthetic condensation polymers is the same diamine, at least 90 mol % of a combined total amount of the diols or the mixture of diols in the synthetic condensation polymers is the same diol, and at least 90 mol % of a combined total amount of the amino acid or the mixture of amino acids in the synthetic condensation polymers is the same amino acid.

17. The container of claim 16, wherein the oriented polymer film layer comprises biaxially oriented polyethylene terephthalate.

18. The container of claim 17, wherein the paperboard layer is adhered to the reinforcing scrim polymer layer.

* * * * *